Feb. 10, 1970   F. R. TOWNER   3,494,672
BEARINGS
Filed April 17, 1968

INVENTOR
FRANK R. TOWNER
BY
ATTORNEY

United States Patent Office 3,494,672
Patented Feb. 10, 1970

3,494,672
BEARINGS
Frank Richard Towner, Wokingham, England, assignor to Sperry Rand Limited, London, England, a company of Great Britain
Filed Apr. 17, 1968, Ser. No. 722,102
Claims priority, application Great Britain, Apr. 25, 1967, 19,022/67
Int. Cl. F16c 7/00, 9/00, 35/00
U.S. Cl. 308—2
10 Claims

ABSTRACT OF THE DISCLOSURE

A bearing allowing limited rotational movement with low torsional constraint comprises two members interconnected by cross-ligament suspension whereby the members are capable of relative rotational movement. Magnetic elements are provided on each of the two members and these elements co-operate to establish a decentralising torque which opposes that due to the suspension.

---

The present invention relates to bearings and it is an object of the invention to provide a bearing for supporting an object for rotation through a limited angle but with very little constraint either in the form of frictional forces or restoring couple.

For certain purposes, for example for the bearings of rotor cases and gimbal rings of gyroscopic apparatus, a bearing is required which will support a relatively heavy load for rotation with a minimum of constraining torque. In many cases the range of angular movement required may be quite small, for example when a gimbal ring of a gyroscopic instrument is mounted in a servo-operated follow-up or phantom ring, and the servo mechanism has a high gain, the required relative angular movement may be 1° or less.

According to the invention a bearing allowing limited rotational movement with low torsional constraint comprises two members interconnected by a cross-ligament suspension whereby the members are capable of relative rotational movement, magnetic elements being provided on each of said members and arranged to co-operate so as to establish a decentralising torque which opposes that due to the suspension.

Preferably, a magnet is provided on one of said members so as to move between a pair of pole pieces provided on the other member thereby establishing a magnetic field between the magnet and the pole pieces such as to produce the torque tending to oppose that due to the suspension. The construction may be made symmetrical, with two or more magnets and corresponding sets of pole pieces.

An adjustable magnetic shunt may be incorporated for adjustment of the magnetic field whereby the magnetically-derived forces can be matched with those due to the spring effect of the cross-ligament suspension. The relative rotational movement of the members is preferably limited so that the members do not become magnetically locked together, and a separate stop or stops may be provided for this purpose. Alternatively, the pole pieces or said one member may be provided with non-magnetic spacing shims or washers.

Figure 1:
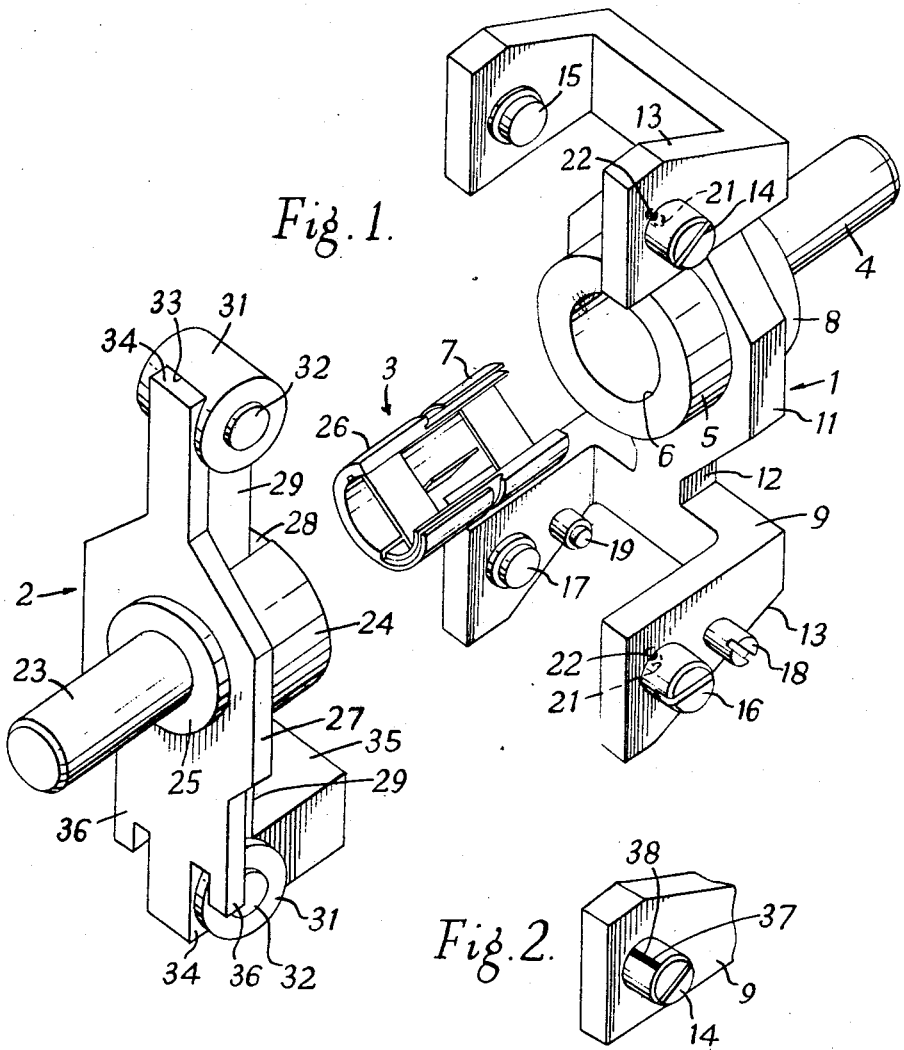
Figure 2:
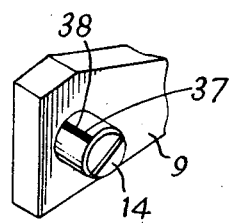
Figure 3:
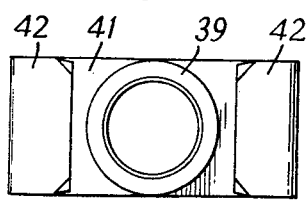
Figure 4:
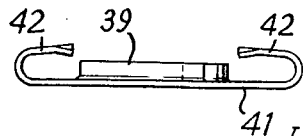

An illustrative embodiment of the invention will now be described, by way of an example, with reference to the accompanying drawings in which:

FIGURE 1 is an exploded view of a bearing according to the invention and for use with a gyroscope, FIGURE 2 shows a perspective view of an alternative component of the bearing of FIGURE 1, FIGURE 3 is a plan view of another alternative component, and FIGURE 4 is a side view of FIGURE 3.

The bearing is designed to support one side of a gimbal of the gyroscope, a similar bearing being provided on the opposite side.

Each bearing comprises two members 1 and 2 interconnected by a cross-ligament suspension 3 whereby the members are capable of limited relative rotational movement. The member 1 is fixed and comprises a shaft 4 formed with a boss 5 at one end, the boss having a central bore 6 into which one element 7 of the suspension 3 is a push fit. The shaft 4 is formed with another boss 8 of smaller diameter than boss 5 and fits in an aperture of a yoke 9.

The yoke 9 is of mumetal and is basically of channel formation with the side limbs cut away over a central portion. The remaining base portion 11 of the yoke 9 is tapered at each end to a waisted portion 12, and the ends of the yoke are tapered inwardly at 13. Two pairs of adjustable magnetic pole pieces 14, 15 and 16, 17 in the form of screws are provided in respective ends of the yoke 9 and in one of the ends a further pair of screws 18, 19 of a non-magnetic material is provided for a purpose to be described. The pole pieces 14, 15, 16 and 17 are each formed with a transverse bore 21 which accommodates a piece of nylon 22.

The shape of the yoke 9, particularly the waisted portion 12, has been carefully chosen so that the lines of magnetic force passing between one pair of pole pieces and the other are substantially parallel or more parallel than if a plain channel section were used for the yoke. The pole pieces 14, 15, 16 and 17 have to be carefully adjusted within fine limits and a problem has arisen in that there must be no relative movement between the screw and tapped hole or there is a tendency to pick-up or cold welding, particularly with mumetal. It was thought that the use of a lubricant such as a grease would overcome this problem and so it does insofar as pick-up or cold welding is prevented but it gives rise to another problem in that it prevents adhesion of jointing compounds, for example, which are used to secure the pole pieces in their adjusted position. It has been found that by providing each pole piece with a piece of nylon 22 accommodated in the bore 21 the tendency to pick-up or cold welding is alleviated and the use of jointing compounds is not prevented.

The other member 2 of the bearing also comprises a shaft, as indicated at 23, which has an end boss 24 and a smaller boss 25, the former having a central bore (not shown) to receive the other element 26 of the suspension 3, and the latter fitting in an aperture in a stop plate 27. The boss 24 is formed with two diametrically opposed slots or flats 28 which receive respective ends of two permanent bar magnets 29 which carry on their other ends fixed cylindrical pole pieces 31 disposed transversely of the bars and formed with pole faces 32 of reduced diameter. Each pole piece 31 is formed with peripheral slots or flats at points spaced by an angle of 90° around its periphery. One of the slots (not seen) receives said other end of the corresponding magnet 29, and the other slot 33 receives a projection 34 of the stopplate 27. The lower pole piece 31 has a further slot or flat which receives one end of a block 35 of the non-magnetic material known under the registered trademark "Inconel."

The lower end of the stop plate 27, as seen in the drawing, is formed with two extensions providing the actual stop 36 of the plate. The stops 36 co-operate with the internal surfaces of the side limbs of the corresponding end of the yoke 9. The widths of the stops 36 are arranged to give an overall rotational movement of about 3° of the member 2 with respect to the member 1. The stop plate 27 is made of titanium, this metal being chosen because it is relatively hard, non-magnetic, and has a coefficient of thermal expansion which approaches that of mumetal. Similar remarks concerning thermal expansion apply to the use of Inconel.

The bearing is assembled by first making up the members 1 and 2, all components of the bearing being demagnetised at this stage. The member 1 is made up by locating the boss 8 in the appropriate aperture in the yoke 9 so that the shaft 4 extends rearwardly of the yoke, and applying the jointing compound so as to lock the shaft in position. The pole pieces 14, 15, 16 and 17 are screwed into the yoke 9, together with the screws 18 and 19.

The member 2 is made up by locating the boss 25 in the appropriate aperture in the stop plate 27 and fixing it in position with jointing compound. The bar magnets 29, pole pieces 31 and the block 35 are then assembled in their respective positions and also fixed with jointing compound. It will be seen that each element of the member 2 is joined to adjacent elements which gives rise to an extremely rigid structure. The bearing is finally assembled by fixing the elements 7 and 26 of the suspension 3 in the corresponding bores of the bosses 5 and 24, care being taken to ensure exact alignment of the longitudinal axes of the shafts 4 and 23 during this operation. The jointing compound may be an epoxy resin which is cured after being applied.

The assembled bearing now has to be adjusted to ensure that the mechanical null position of the suspension 3 coincides with the magnetic null position. This is done by first ascertaining the mechanical null position with the use of a collimator, the bearing being held in a fixture. The member 1 is then locked with respect to the member 2 by tightening the screws 18 and 19 onto the block 35, the latter being provided solely for this purpose. It is at this stage that the magnets 29 are magnetised using suitable pole pieces and magnetising to saturation four times to give a flux of 1100 gauss minimum between the pole pieces 31 and associated pole screws.

The bearing is next replaced in the fixture and the collimator set very accurately to the mechanical null position and the screws 18 and 19 loosened. If the magnetic null position does not coincide with the mechanical null position, the member 2 will rotate. The pole screws, toward which respective ends of member 2 rotate are now unscrewed until the two null positions coincide. It will be found that in most cases all four pole screws 14, 15, 16 and 17 will have to be adjusted. Due to magnetic hysteresis the member 2 will not return to the null position after deflection and the pole screws 14, 15, 16 and 17 have to be adjusted so that this hysteresis is symmetrical about the mechanical null position.

When all the necessary adjustment has been carried out the pole screws 14, 15, 16 and 17 are locked in position by an adhesive. The bearing is then ready for assembly into the gyroscope. Care has to be taken to ensure that the bearing is not brought into close proximity with any magnetic material.

In one example of a bearing according to the present invention the pole pieces 14, 15, 16 and 17 were adjusted to allow a travel of just over 1° either side of the null position. The spring rate of the cross-ligament suspension 3 was 0.92 gr.-cm. per minute of arc, and the pole pieces 14, 15, 16 and 17 were adjusted to provide a counterbalancing rate of minute 0.72 gr.-cm. per minute of arc, giving a resultant of 0.20 gr.-cm. per minute were used to support a gyro gimbal ring and rotor case assembly having a total mass of about 1.5 kg. designed to be subjected in use to acceleration forces of up to 20 g., giving instantaneous loads of 30 kg.

In a second example the spring rate of the suspension 3 was again 0.92 gr.-cm. per minte and the magnetic counterbalance rate was 0.875 gr.-cm. per minute, giving a resultant of 0.045 gr.-cm. per minute.

As an alternative to the use of the pieces of nylon 22, strips 37 of nylon may be employed as illustrated in FIGURE 2 of the drawings. The strips 37 are accommodated in longitudinal grooves 38 in the pole pieces 14, 15, 16 and 17 and the outer surfaces are arranged to be slightly proud of the screw threads, that is, arranged to extend slightly higher than the screw threads in a radial direction.

As a further alternative to the use of the pieces of nylon 22, the screw threads of the pole pieces 14, 15, 16 and 17 and corresponding tapped holes in the yoke 9 are made to easy tolerances although there must be no imperfections or roughness in the threads. A spring nut 39 (FIGURES 3 and 4) is provided on each pole piece, the nut being provided with a strip of metal 41 having its ends bent over at 42. In use the ends 42 of the metal strip 41 bear against the adjacent surface of the yoke 9 and urge the associated pole piece out of the corresponding hole in the yoke 9. Thus each pole piece can be finely adjusted and locked into position by a jointing compound, for example, while the tendency to pick-up or cold welding is alleviated due to the use of relatively sloppy screw threads.

I claim:
1. A bearing allowing limited rotational movement with low torsional constraint comprising two members interconnected by a cross-ligament suspension whereby the members are capable of relative rotational movement, magnetic elements being provided on each of said members and arranged to co-operate so as to establish a decentralising torque which opposes that due to the suspension.

2. A bearing according to claim 1, wherein a permanent magnet is provided on one of said members so as to be movable between a pair of pole pieces provided on the other member, thereby establishing a magnetic field between the magnet and the pole pieces such as to produce the torque opposing that due to the suspension.

3. A bearing according to claim 1, wherein one of said members comprises a yoke of general channel formation and having a central portion of the side limbs cut away with the remaining base portion tapered at each end to a waisted portion and also having ends which taper inwardly.

4. A bearing according to claim 3, wherein the magnetic elements on one of said members comprises a pair of pole pieces provided in opposed side limbs of the yoke member.

5. A bearing according to claim 1, wherein the magnetic elements on one of said members comprises a pair of pole pieces which are screw threaded for adjustment and for ease of adjustment are provided with a transverse bore accommodating a piece of nylon the outer surface of which is slightly higher than the screw threads.

6. A bearing according to claim 1, wherein the magnetic elements on one of said members comprises a pair of pole pieces which are screw threaded for adjustment and for ease of adjustment are provided with a longitudinal slot accommodating a piece of nylon the outer surface of which is slightly higher than the screw threads.

7. A bearing according to claim 1, wherein the magnetic elements on one of said members comprises a pair of pole pieces which are screw threaded for adjustment and are provided with a nut having a strip of resilient material secured thereto, the ends of the resilient material being bent over and arranged in use to bear against a surface of the component into which the pole piece is screwed so as to urge the pole piece out of that component.

8. A bearing according to claim 1, wherein one member is provided with a projection and the other member is provided with means arranged to co-operate with said projection whereby to lock the members in a fixed relative position for setting-up purposes.

9. A bearing according to claim 8, wherein said projection is in the form of a block of material secured to said one member, and wherein said means comprise a pair of screws provided on the other member.

10. A bearing according to claim 1 wherein one of said members compirses a stop plate to which is secured a boss formed on a shaft, and the magnetic elements on one of said members comprises a pair of pole pieces, the stop plate being formed with projections each secured to a respective pole piece which in turn is secured to a respective permanent magnetic, the magnets being secured to a further boss formed on said shaft whereby the resulting structure is fully interlocking and hence rigid.

References Cited

UNITED STATES PATENTS

| 2,175,631 | 10/1939 | Koster | 74—5.46 |
| 2,509,446 | 5/1950 | Oplinger | 74—5.46 X |
| 3,081,552 | 3/1963 | Reason | 308—2 X |
| 3,173,120 | 3/1965 | Marks | 308—2 |

FOREIGN PATENTS

| 884,263 | 12/1961 | Great Britain. |
| 545,284 | 5/1942 | Great Britain. |

MARTIN P. SCHWADRON, Primary Examiner

L. L. JOHNSON, Assistant Examiner

U.S. Cl. X.R.

308—15, 28